(12) United States Patent
Park

(10) Patent No.: US 9,970,500 B2
(45) Date of Patent: *May 15, 2018

(54) BRAKE ACTUATOR HAVING SEALING STRUCTURE FOR INSIDE AIR CIRCULATION

(71) Applicant: G&P AUTOMOTIVE CO., LTD., Jeollabuk-do (KR)

(72) Inventor: Han Joo Park, Jeollabuk-do (KR)

(73) Assignee: MIRAEVC CO., LTD., Jeollabuk-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/307,537

(22) PCT Filed: May 7, 2015

(86) PCT No.: PCT/KR2015/004542
§ 371 (c)(1),
(2) Date: Oct. 28, 2016

(87) PCT Pub. No.: WO2016/006816
PCT Pub. Date: Jan. 14, 2016

(65) Prior Publication Data
US 2017/0051803 A1    Feb. 23, 2017

(30) Foreign Application Priority Data
Jul. 11, 2014  (KR) .......................... 10-2014-0087230

(51) Int. Cl.
*B60T 13/58* (2006.01)
*F16D 65/28* (2006.01)
(Continued)

(52) U.S. Cl.
CPC .............. *F16D 65/28* (2013.01); *B60T 13/38* (2013.01); *B60T 17/083* (2013.01);
(Continued)

(58) Field of Classification Search
CPC .......... F16D 65/28; B60T 13/38; B60T 17/083
(Continued)

(56) References Cited

U.S. PATENT DOCUMENTS

| 5,722,311 A | * | 3/1998 | Pierce | B60T 17/083 |
| | | | | 92/130 A |
| 6,907,818 B2 | * | 6/2005 | Anderson | B60T 13/261 |
| | | | | 92/62 |

(Continued)

FOREIGN PATENT DOCUMENTS

| JP | 2013-233920 | 11/2013 |
| KR | 10-1176856 | 8/2012 |

(Continued)

OTHER PUBLICATIONS

International Search Report dated Jul. 22, 2015 for PCT/KR2015/004542.

*Primary Examiner* — Christopher P Schwartz

(57) ABSTRACT

Disclosed is an air-operated brake actuator, including: a hollow upper housing; a hollow lower housing spaced apart from the upper housing in a lower direction; a coupling housing configured to couple and restrain the upper housing and the lower housing to each other; a piston disposed in the upper housing to divide an inside of the upper housing into a spring chamber and a pressure chamber disposed below the spring chamber; a hollow actuator rod disposed in the piston; a casing bolt head disposed at a lower end of the actuator rod and having an air flow hole formed therein; a pilot lip seal fixed to an outer surface of the casing bolt head to seal an outer end of the air flow hole; and a compression spring installed in the spring chamber.

5 Claims, 3 Drawing Sheets

(51) Int. Cl.
    *B60T 13/38*     (2006.01)
    *B60T 17/08*     (2006.01)
    *F16D 121/04*     (2012.01)
    *F16D 125/08*     (2012.01)
    *F16D 121/08*     (2012.01)

(52) U.S. Cl.
    CPC ...... *F16D 2121/04* (2013.01); *F16D 2121/08* (2013.01); *F16D 2125/08* (2013.01)

(58) Field of Classification Search
    USPC .............. 188/153 D, 170; 92/63, 130, 130 A
    See application file for complete search history.

(56) References Cited

U.S. PATENT DOCUMENTS

| | | | |
|---|---|---|---|
| 7,513,341 B2* | 4/2009 | Lachermeier | B60T 17/083 188/153 D |
| 7,845,474 B2* | 12/2010 | Schodrowski | B60T 17/083 188/153 D |
| 2013/0032437 A1* | 2/2013 | Akin | B60T 17/083 188/106 F |
| 2013/0292216 A1* | 11/2013 | Bradford | B60T 17/083 188/106 F |

FOREIGN PATENT DOCUMENTS

| | | |
|---|---|---|
| KR | 10-2013-0011798 | 1/2013 |
| KR | 10-2013-0011802 | 1/2013 |

\* cited by examiner

BRAKE ACTUATOR HAVING SEALING STRUCTURE FOR INSIDE AIR CIRCULATION

This application claims the priority of Korean Patent Application Nos. 10-2014-0087230, filed on Jul. 11, 2014 in the KIPO (Korean Intellectual Property Office), the disclosure of which is incorporated herein entirely by reference. Further, this application is the National Stage application of International Application No. PCT/KR2015/004542, filed May 7, 2015, which designates the United States and was published in Korean. Each of these applications is hereby incorporated by reference in their entirety into the present application.

TECHNICAL FIELD

This disclosure relates to a brake actuator, and more particularly, to a brake actuator having a simple sealing structure for inside air circulation to operate a brake.

BACKGROUND ART

An air brake system for a vehicle such as a bus, a truck, a trailer, other heavy vehicles or the like includes a brake shoe and a drum assembly operated by an actuator assembly which is driven by selectively applying a compressed air.

A general air brake actuator includes both a service brake actuator for driving a brake in a general running state by applying a compressed air and a spring-type emergency brake actuator for driving a brake when an air pressure is released.

The emergency brake actuator includes a compression spring for pressing the brake when an air pressure is released.

The emergency brake actuator is also called a spring brake.

The air-operated brake actuator may be a piston type actuator or a diaphragm type actuator.

In a diaphragm type actuator, a brake actuator and two air-operated diaphragm brake actuators are generally disposed in a tandem vehicle form, and this diaphragm type actuator includes an air-operated service brake actuator for operating a general brake and a spring brake actuator for operating a parking brake or an emergency brake of a vehicle.

The service brake actuator and the spring brake actuator include a housing having an elastic diaphragm, which divides the inside of the housing into two distinguishable fluid chambers.

Meanwhile, the piston brake actuator is operated in the same way as above except for the diaphragm, and the piston reciprocates in a cylinder for operating the parking brake of a vehicle.

In a general service brake actuator, the service brake housing is divided into a pressure chamber and a push rod chamber.

The pressure chamber is connected to a source of the compressed air to allow movement of fluid between them, and the push rod chamber has a push rod mounted thereto and is connected to a brake assembly to introduce or discharge a compressed air into or out of the pressure chamber by reciprocating the push rod into or out of the housing which drives or releases the brake.

In a general spring brake actuator, the spring brake housing is divided into a pressure chamber and a spring chamber.

Both ends of the pressure plate opposite to each other are located at the spring chamber between the diaphragm and the strong compression spring in contact with the housing.

The actuator rod extends through the pressure plate and the diaphragm to the pressure chamber and extends from the service brake actuator through a partition wall which divides the spring brake actuator, as well known in the art.

An end of the actuator is connected to the pressure chamber of the service brake actuator to allow movement of fluid between them.

When the parking brake is operated, the pressure of the spring brake actuator is discharged from the pressure chamber, and the strong compression spring pushes the pressure plate and the diaphragm toward the partition wall between the spring brake actuator and the service brake actuator.

At this location, the actuator rod connected to the pressure plate is pushed to operate the parking brake or the emergency brake and forces the vehicle not to move.

In order to release the parking brake, the pressure chamber is closed against the atmosphere, and the compressed air expands the pressure chamber and moves the diaphragm, and also moves the pressure plate toward the opposite ends of the housing of the spring brake actuator so that the strong compression spring is introduced into the pressure chamber of the spring brake actuator.

Meanwhile, in a process of operating the parking brake to maintain a parking state, in a process of releasing the parking brake to maintain a running state, or in a process of operating the foot brake in a running state, in order to facilitate smooth operations of these processes, channels should be provided to ensure air flow among a plurality of chambers of the air-compression brake actuator, namely a spring chamber, a pressure chamber and a service chamber.

In an existing spring-type air-compression brake actuator using an air pressure, the difference in air pressure, caused by expansion and shrinkage of the chambers in each process, is solved by introducing an external air. For this, a plurality of chambers including a spring chamber, a pressure chamber and a service chamber should be connected through an external tube, or the plurality of chambers should be connected to the outside through a separate tube. However, this configuration needs a complicated channel structure.

DISCLOSURE OF THE INVENTION

Technical Problem

This disclosure is directed to providing a brake actuator having a sealing structure for inside air circulation, which includes a pilot lip seal installed at a hollow actuator rod of the brake actuator to control inside air circulation so that an air flow from a spring chamber to a service chamber or in an opposite direction is opened or closed according to each operation condition.

Technical Solution

In one general aspect, there is provided an air-operated brake actuator, comprising: a hollow upper housing; a hollow lower housing spaced apart from the upper housing in a lower direction; a coupling housing configured to couple and restrain the upper housing and the lower housing to each other; a piston disposed in the upper housing to divide an inside of the upper housing into a spring chamber and a pressure chamber disposed below the spring chamber; a hollow actuator rod disposed in the piston; a casing bolt head disposed at a lower end of the actuator rod and having an air flow hole formed therein; a pilot lip seal fixed to an outer surface of the casing bolt head to seal an outer end of the air flow hole; a compression spring installed in the spring chamber; a diaphragm disposed in the lower housing to divide an inside of the lower housing into a service chamber and a push rod chamber disposed below the service chamber; a pressure plate configured to contact a lower end of the diaphragm and move vertically along the diaphragm; and a push rod having one end vertically coupled to a lower end of the pressure plate and the other end located in the push rod chamber through a through hole of the upper housing.

The pilot lip seal may include: a seal body fixed to a protrusion formed at the outer surface of the casing bolt head; and a flexible seal portion extending down from the seal body.

The casing bolt head may be gradually narrowed downwards based on a portion where the air flow hole is formed, and an outer end of the air flow hole may be disposed to be inclined toward the casing bolt head in a lower direction.

The air flow hole may be provided in plural in a radial direction from a center of the casing bolt head.

Advantageous Effects

In the brake actuator according to the present disclosure, a pilot lip seal for controlling inside air circulation is installed at a lower portion of a hollow actuator rod of the brake actuator, so that an air flow from a spring chamber to a service chamber or in an opposite direction is opened or closed according to each operation condition, thereby opening or closing an internal air flow with a very simple structure while ensuring the same function as an existing complicated structure.

MODE FOR CARRYING OUT THE INVENTION

Figure 1:
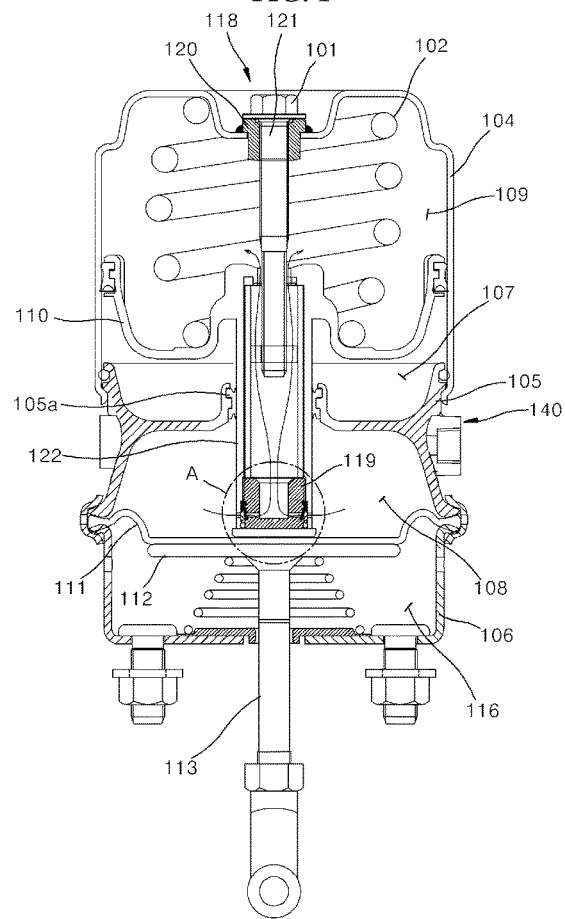
FIG. 1 is a cross-sectional view showing a brake actuator having a sealing structure for inside air circulation according to an embodiment of the present disclosure, which depicts a parking state in which a parking brake is operated.

Hereinafter, embodiments of the present disclosure will be described in detail with reference to the accompanying drawings. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the drawings, like reference numerals denote like elements.

The present disclosure is designed to allow an air flow between a spring chamber and a service chamber, disposed with a pressure chamber being interposed between them, by means of an internal configuration by using a pilot lip seal installed at a lower portion of an actuator rod, but the present disclosure may also be applied to other fields without being limited thereto.

A brake actuator having a sealing structure for inside air circulation according to the present disclosure may be fabricated in an integrated form or as separated components as necessary. In addition, some components may be excluded depending on its service pattern.

It should be noted that when endowing reference numerals to components depicted in the drawings, the same reference numeral is given to the same component even though this component is depicted in different drawings. In addition, in the description, details of well-known features and techniques may be omitted to avoid unnecessarily obscuring the presented embodiments.

In addition, when explaining components of the present disclosure, the terms "first", "second", "A", "B", "(a)", "(b)" or the like can be used. These terms are just for distinguishing components from each other, and natures, arrangements or orders of the components are not limited due to these terms. When it is described that any component is "connected", "coupled" or "joined" to another component, the component may be directly connected or coupled to another component, but it should be understood that any other component may also be "connected", "coupled" or "joined" between them.

Figure 2:
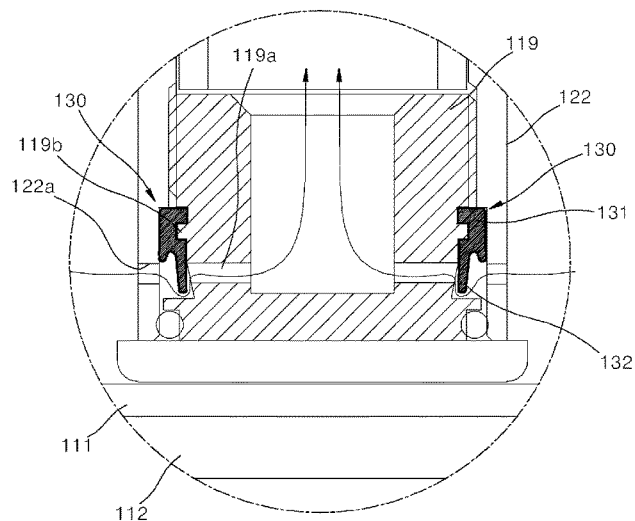
FIG. 2 is an enlarged view showing a portion A of FIG. 1.

FIG. 1 is a cross-sectional view showing a brake actuator having a sealing structure for inside air circulation according to an embodiment of the present disclosure, which depicts a parking state in which a parking brake is operated, and FIG. 2 is an enlarged view showing a portion A of FIG. 1.

The present disclosure provides a structure in which an air flow between a spring chamber 109 and a service chamber 108 of a brake actuator is performed agreeably through a pilot lip seal 130 coupled to a lower end of a hollow actuator rod 122 disposed between the spring chamber 109 and the service chamber 108.

By doing so, in the present disclosure, an air pressure in the spring chamber 109 is always maintained consistently, and a compression spring 102 is operated softly without a distorted center line when being compressed or expanded.

A brake actuator according to the present disclosure includes a hollow spring brake cover 104, an adaptor housing 105 and a service brake cover 106, arranged in order from top to bottom, and further includes a piston 110 disposed between the spring brake cover 104 and the adaptor housing 105, a diaphragm 111 disposed between the adaptor housing 105 and the service brake cover 107, an actuator rod 122 coupled to the piston 110 to extend downwards and installed through the adaptor housing 106, and a pilot lip seal 130 disposed at a lower end of the actuator rod 122 to seal the actuator rod 122.

The space for the brake actuator according to the present disclosure includes a spring chamber 109 serving as an upper space of the piston 110 within the spring brake cover 104, a pressure chamber 107 serving as a lower space of the piston 110 within the spring brake cover 104, a service chamber 108 serving as a space formed by the adaptor housing 105 and the diaphragm 111, and a push rod chamber 116 serving as a space between the diaphragm 111 and the service brake cover 106.

The compression spring 102 is a coil spring disposed in the spring chamber 109, and a coil diameter is gradually increased from a lower end of the coil spring to a middle portion thereof in a height direction of the coil spring and is gradually decreased from the middle portion to an upper end thereof.

The lower end of the compression spring 102 is in contact with the piston 110 and supported by the piston 110, and the upper end of the compression spring 102 is in contact with and supported by the upper end of the spring brake cover 104.

Meanwhile, a piston hole stopper guide (not shown) shaped with a curve conforming to an inner side of the spring brake cover 104 may be disposed at the upper end of the spring brake cover 104, and the piston hole stopper guide may prevent the upper end of the compression spring 102 from being moved so that the compression spring 102 may be always compressed while maintaining its center axis consistently.

The piston 110 is closely adhered to the inside of the spring brake cover 104 and divides the inner space of the spring brake cover 104 into a pressure chamber 107 and a spring chamber 109.

For this, the piston 110 is formed to closely adhere to the inside of the spring brake cover 104.

The hollow actuator rod 122 is formed through a through hole in the piston 110. The upper end of the actuator rod 122 is in contact with and supported by the lower end of the piston 110, and the lower end of the actuator rod 122 is in contact with and supported by the diaphragm 111 through a through hole of the adaptor housing 105.

A casing bolt assembly 118 is formed in the hollow actuator rod 122 from an outer side of the spring brake cover 104 to an inner side thereof. The casing bolt assembly 118 has an adjustment bolt 101 screwed to a casing bolt 121.

The casing bolt assembly 118 includes the casing bolt 121 and a casing bolt head 119, disposed in the hollow actuator rod 122, and the other end of the casing bolt 121 extends through an axial opening. Also, the casing bolt assembly 118 is fixed by threading through a collar 120 to be substantially sealed. The adjustment bolt 101 is permanently fixed on the casing bolt 121.

The casing bolt assembly 118 is used for mechanically shrinking and supporting the compression spring 102 which is in a compressed state to give a strong force. By rotating the adjustment bolt 101, it is possible to release the casing bolt 121 screwed to the spring brake housing 104.

As the casing bolt 121 retreats, the casing bolt head 118 comes into contact with a bearing at the upper end of the actuator rod 122, which allows the actuator and the pressure plate to retreat along the casing bolt 121, and thus compresses the spring.

The casing of the compression spring which gives a great force is well known in the art, and the casing is used for mechanically releasing a brake or assembling a brake actuator when a compressed air system is damaged or not in service.

An adaptor housing 105 formed to be connected and coupled to the service brake cover 106 is disposed at a lower portion of the spring brake cover 104 which configures an upper housing.

The adaptor housing 105 has a through hole formed therein, and the actuator rod 122 is in contact with and supported by the diaphragm 111 in the service brake cover 106 through the through hole.

At a portion of the hollow actuator rod 122 which is in contact with the adaptor housing 105, a sealing assembly 105a is formed out of the hollow actuator rod 122 in order to prevent a fluid from being leaked.

The diaphragm 111 is formed in the service brake cover 106 configuring a lower housing so as to be in contact with and supported by the pressure plate 112 to divide the service brake cover 106 into a pressure chamber 108 and a push rod chamber 116.

The pressure plate 112 is supported by a push rod 113 and plays a role of transferring the movement of the diaphragm 111 according to an air pressure to the push rod 113.

Therefore, the diaphragm 111 moves the pressure plate 112 up and down according to an elastic force of the compression spring 102 of the spring chamber 109 and an adjusted air pressure in the pressure chamber 107, and thus it is possible to adjust whether or not to operate a brake (not shown) connected to a lower end of the push rod 113 which is formed to be vertically movable through the lower end of the service brake cover 106.

Meanwhile, the spring brake cover 104, the adaptor housing 105 and the service brake cover 106 may be all together called a housing serving as a cover forming an outer surface of the brake actuator according to the present disclosure.

The hollow actuator rod 122 disposed through the through hole in the piston 110 has a casing bolt head 119 disposed at a lower end thereof and having an air flow hole 119a formed therein. The air flow hole 119a is disposed adjacent to a rod hole 122a formed in the actuator rod 122 and resultantly communicates with the rod hole 122a.

The pilot lip seal 130 is fixed to an outer surface of the casing bolt head 119 and functions to seal an outer end of the air flow hole 119a.

In the overall inside air circulations structure, in a state where the upper and lower ends of the hollow actuator rod 122 are disposed at the spring chamber 109 and the service chamber 108, the pilot lip seal 130 is able to close or open the air flow hole 119a to ensure an air flow between the spring chamber 109 and the service chamber 108.

The pilot lip seal 130 includes a seal body 131 fixed to a protrusion 119b formed at the outer surface of the casing bolt head 119 and a flexible seal portion 132 extending downwards from the seal body 131.

The casing bolt head 119 is narrowed downwards based on a portion where the air flow hole 119a is formed. In other words, the outer end of the air flow hole 119a may be disposed to be inclined into the casing bolt head 119 in a lower direction. In detail, a plurality of air flow holes 119a may be formed at the casing bolt head 119 in a radial direction from a center thereof, and a ring-shaped pilot lip seal 130 may be disposed to surround the outer ends of the plurality of air flow holes 119a.

In this structure, the flexible seal portion 132 of the pilot lip seal 130 is disposed at the outer end of the air flow hole 119a. The flexible seal portion 132 may be made of a flexible material which may be bent when a high pressure air is applied from the outside. In other case, when an external air pressure is strongly applied to the pilot lip seal 130 by supplying a high pressure air through the service chamber 108, the flexible seal portion 132 may be strongly adhered to the outer end of the air flow hole 119a to prevent an air from flowing through the air flow hole 119a.

In a general vertical movement of the piston 110, the air flow hole 119a is formed to allow an air to naturally flow between the spring chamber 109 and the service chamber 108. However, if the foot brake is stepped down in a state where the piston 110 is completely moved up to open the brake, the air flow hole 119a is closed by means of the pilot lip seal 130 to prevent a high pressure air from flowing into the spring chamber 109 and thus completely locking the brake.

A state of the brake actuator in a parking state of a vehicle will be described with reference to FIGS. 1 and 2.

When a vehicle is parked, a compressed air is discharged through a valve structure 140 from the pressure chamber 107 of the air-operated brake actuator. In other words, for example, the pressure chamber 107 may be in an equilibrium state with the atmosphere.

In this state, according to a restoring force of the compression spring 102, the piston 110 moves in a lower direction. As a result, as the piston 110 moves down due to the expansion of the compression spring 102, the actuator rod 122 moves down together.

If the compression spring 102 is expanded, the space in the spring chamber 109 increases naturally. Therefore, the air in the service chamber 108 moves to the spring chamber 109 through the inside of the actuator rod 122 and the air flow hole 119a of the pilot lip seal 130.

As described above, the air pressures in the spring chamber 109 and the service chamber 108 are maintained consistently, and thus the brake may be locked agreeably.

In addition, the actuator rod 122 moving down together with the piston 110 allows the push rod 113 to move in a lower direction. By doing so, a brake pad (not shown) moves adjacent to a brake disk (not shown). Therefore, the air-operated brake actuator is shifted into a locked state, and thus the brake comes from a running state into a parking state.

Figure 3:
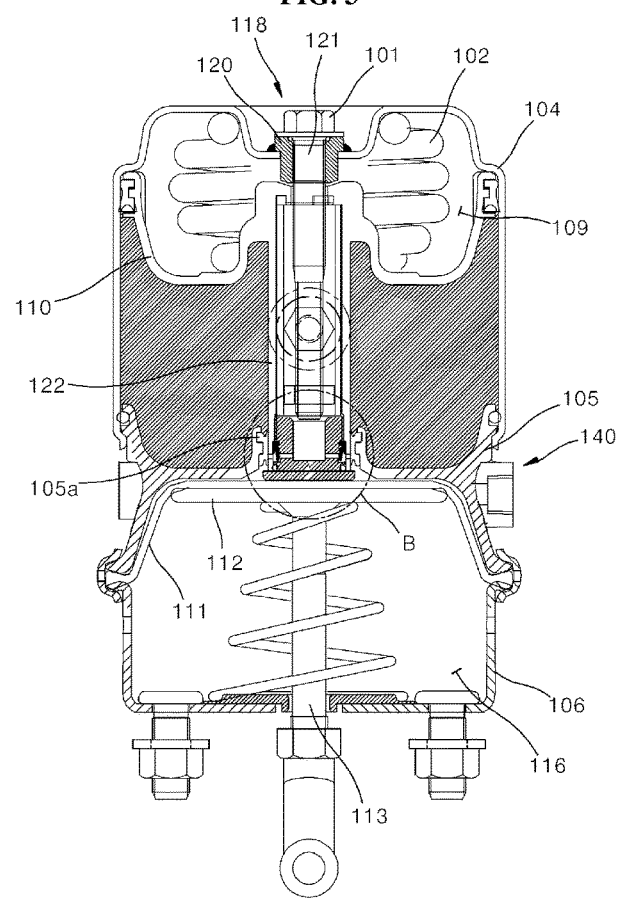
FIG. 3 is a cross-sectional view showing a brake actuator in a running state of a vehicle where a parking brake is released by means of inside air circulation through a pilot lip seal which connects a spring chamber to a service chamber.
Figure 4:
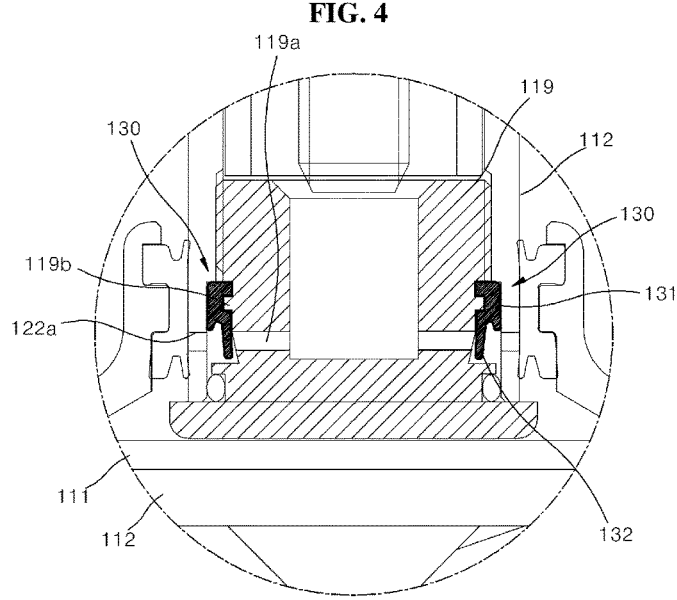
FIG. 4 is an enlarged view showing a portion B of FIG. 3.

FIG. 3 is a cross-sectional view showing a brake actuator in a running state of a vehicle where a parking brake is released by means of inside air circulation through a pilot lip seal which connects a spring chamber to a service chamber, and FIG. 4 is an enlarged view showing a portion B of FIG. 3.

Hereinafter, a state of the brake actuator when a vehicle is running will be described with reference to FIGS. 3 and 4.

When a vehicle is running, a compressed air is injected from an external compressor (not shown) into the pressure chamber 107 of the air-operated brake actuator through the valve structure 140.

The air injection is not depicted in the figures, but an air may be injected through a side of the adaptor housing 105 or the spring brake cover 104. However, the present disclosure is not limited thereto, and an air may be injected through any portion as long as the air is injected into the pressure chamber 107.

As a compressed air is injected into the pressure chamber 107, an air pressure in the pressure chamber 107 is increased. Due to the increased air pressure, the air in the pressure chamber 107 generates a pressure to the outside of the pressure chamber 107.

Due to this pressure, the piston 110 connected to actuator rod 122 to be vertically movable is moved upwards toward the spring chamber 109.

As a result, the compression spring 102 is compressed and shrunken, and the actuator rod 122 also moves upwards along the piston 110.

If the compression spring 102 is shrunken, the space in the spring chamber 109 decreases naturally. Therefore, the air in the spring chamber 109 moves to the service chamber 108 through the inside of the actuator rod 122 and the air flow hole 119a of the pilot lip seal 130, and the air in the service chamber 108 is emitted out through the valve structure 140 as the volume of the service chamber 108 decreases As described above, since the air pressure in the spring chamber 109 is maintained consistently, the brake may be unlocked agreeably.

If the piston 110 completely moves up, the rod hole 122a of the actuator rod 122 comes into contact with the piston hole stopper guide 105a to block an air flow through the air flow hole 119a.

By doing so, after an air is injected into the pressure chamber 107 to unlock the brake, even though an air is continuously injected thereto, the air in the spring chamber 109 is not leaked out, and thus the brake may be maintained in the unlocked state.

In addition, the actuator rod 122 moving upwards together with the piston 110 forms a negative pressure in the service chamber 108. Therefore, due to the generated negative pressure, the diaphragm 111 moves upwards together.

In addition, a spring for giving a restoring force may be installed at a lower end of the pressure plate 112. Therefore, due to the negative pressure and the restoring force of the spring, the pressure plate 112 moves upwards together. As a result, the push rod 113 vertically formed at the lower end of the pressure plate 112 moves upwards together.

As the push rod 113 moves upwards into the brake actuator, the brake pad (not shown) is separated from the brake disk (not shown). Therefore, the locked state of the brake is released, and thus the vehicle may come into a running state.

Figure 5:
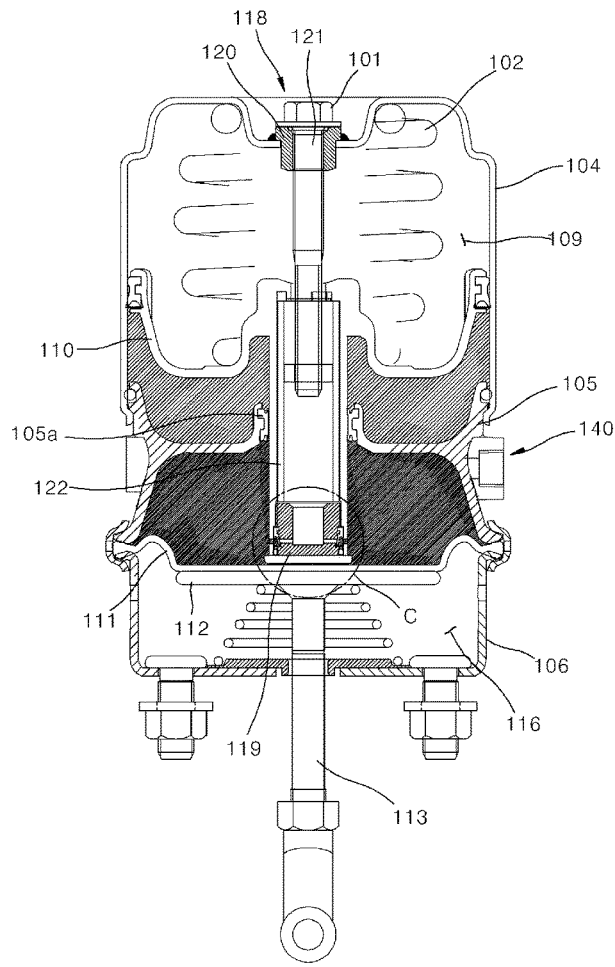
FIG. 5 is a cross-sectional view showing a brake actuator in a state where a foot brake is temporarily stepped down in a running state, where the brake is temporarily operated in a state where the pilot lip seal connecting the spring chamber to the service chamber blocks inside air circulation.
Figure 6:
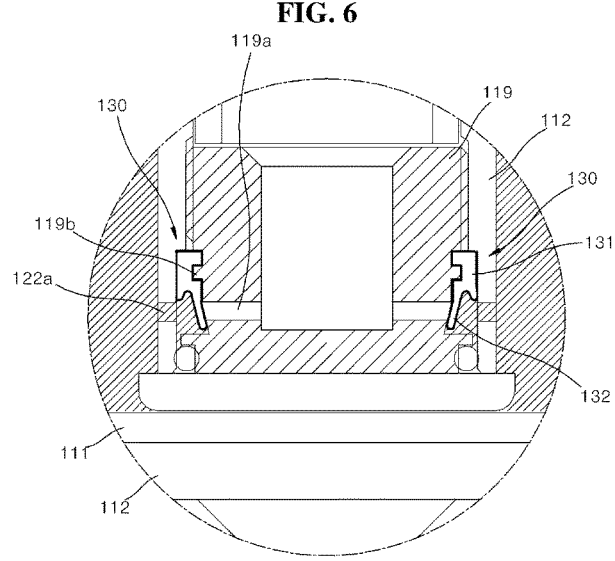
FIG. 6 is an enlarged view showing a portion C of FIG. 5.

FIG. 5 is a cross-sectional view showing a brake actuator in a state where a foot brake is temporarily stepped down in a running state, where the brake is temporarily operated in a state where the pilot lip seal connecting the spring chamber to the service chamber blocks inside air circulation, and FIG. 6 is an enlarged view showing a portion C of FIG. 5.

Hereinafter, a state of the brake actuator when the foot brake is temporarily stepped down will be described with reference to FIGS. 5 and 6.

In a running state of a vehicle, the compressed air is maintained in a state of being injected into the pressure chamber 107. In this state, if the foot brake is operated, a high pressure compressed air flows into the service chamber 108 through the valve structure 140. In this case, the pressure of the compressed air injected into the service chamber 108 is maintained higher than the pressure of the compressed air present in the pressure chamber 107.

While a high pressure compressed air flows into the service chamber 108, if a strong air pressure is applied to an outer side of the pilot lip seal 130, the flexible seal portion 132 is strongly adhered to the outer end of the air flow hole 119a to prevent an air from flowing through the air flow hole 119a.

In this state, the pressure plate 112 is pushed downwards due to the expansion of the service chamber 108, and as a result, the push rod 113 vertically formed at the lower end of the pressure plate 112 is moved down together.

As the push rod 113 moves down below the brake actuator, the brake pad (not shown) moves adjacent to the brake disk (not shown), and accordingly the brake temporarily maintains a locked state.

Meanwhile, as the actuator rod 122 moves down, the spring chamber 109 is expanded to form a relative negative pressure, and the pressure chamber 107 is shrunken to form a relative positive pressure. When the foot brake is temporarily operated to keep braking and then the foot brake is released to restore a running state, the above process allows the actuator rod 122 to move upwards naturally.

As described above, if the foot brake is stepped down in a state where the piston 110 completely moves up to open the brake, the air flow hole 119a is closed by means of the pilot lip seal 130 to prevent a high pressure air from flowing into the spring chamber 109 and thus completely locking the brake.

As described above, the brake actuator according to the present disclosure includes a pilot lip seal installed at a lower portion of a hollow actuator rod of the brake actuator to control inside air circulation, so that an air flow from a spring chamber to a service chamber or in an opposite direction is opened or closed according to each operation condition, thereby opening or closing an internal air flow with a very simple structure while ensuring the same function as an existing complicated structure.

Even though the embodiments of the present disclosure have been described and illustrated, the present disclosure is not limited to the specific embodiments but may be modified in various ways by those skilled in the art without departing from the scope of the present disclosure defined by the appended claims, and such modifications should not be interpreted separately from the technical feature and prospect of the present disclosure.

The invention claimed is:

1. An air-operated brake actuator, comprising:
   a hollow upper housing;
   a hollow lower housing spaced apart from the upper housing in a lower direction;
   a coupling housing configured to couple and restrain the upper housing and the lower housing to each other;
   a piston disposed in the upper housing to divide an inside of the upper housing into a spring chamber and a pressure chamber disposed below the spring chamber;
   a hollow actuator rod disposed in the piston;
   a casing bolt head disposed at a lower end of the actuator rod and having an air flow hole formed therein;
   a pilot lip seal fixed to an outer surface of the casing bolt head to seal an outer end of the air flow hole;
   a compression spring installed in the spring chamber;
   a diaphragm disposed in the lower housing to divide an inside of the lower housing into a service chamber and a push rod chamber disposed below the service chamber;
   a pressure plate configured to contact a lower end of the diaphragm and move vertically along the diaphragm; and
   a push rod having one end vertically coupled to a lower end of the pressure plate and the other end located in the push rod chamber through a through hole of the lower housing,
   wherein the casing bolt head is gradually narrowed downwards based on a portion where the air flow hole is formed,
   wherein an outer end of the air flow hole is disposed to be inclined toward the casing bolt head in a lower direction.

2. The air-operated brake actuator of claim 1, wherein the pilot lip seal comprising:
   a seal body fixed to a protrusion formed at the outer surface of the casing bolt head; and
   a flexible seal portion extending down from the seal body.

3. The air-operated brake actuator of claim 1, wherein the air flow hole is provided in plural in a radial direction from a center of the casing bolt head.

4. An air-operated brake actuator, comprising:
   a hollow upper housing;
   a hollow lower housing spaced apart from the upper housing in a lower direction;
   a coupling housing configured to couple and restrain the upper housing and the lower housing to each other;
   a piston disposed in the upper housing to divide an inside of the upper housing into a spring chamber and a pressure chamber disposed below the spring chamber;
   a hollow actuator rod disposed in the piston;
   a casing bolt head disposed at a lower end of the actuator rod and having an air flow hole formed therein;
   a pilot lip seal fixed to an outer surface of the casing bolt head to seal an outer end of the air flow hole, the pilot lip seal comprising:
      a seal body fixed to a protrusion formed at the outer surface of the casing bolt head; and
      a flexible seal portion extending down from the seal body; and
   a diaphragm disposed in the lower housing to divide an inside of the lower housing into a service chamber and a push rod chamber disposed below the service chamber,
   wherein the casing bolt head is gradually narrowed downwards based on a portion where the air flow hole is formed,
   wherein an outer end of the air flow hole is disposed to be inclined toward the casing bolt head in a lower direction.

5. The air-operated brake actuator of claim 4, wherein the air flow hole is provided in plural in a radial direction from a center of the casing bolt head.

* * * * *